United States Patent [19]

Flynn et al.

[11] Patent Number: 5,155,854
[45] Date of Patent: Oct. 13, 1992

[54] SYSTEM FOR ARBITRATING COMMUNICATION REQUESTS USING MULTI-PASS CONTROL UNIT BASED ON AVAILABILITY OF SYSTEM RESOURCES

[75] Inventors: Michael E. Flynn, Grafton; Tryggve Fossum, Northboro, both of Mass.

[73] Assignee: Digital Equipment Corporation, Maynard, Mass.

[21] Appl. No.: 306,871

[22] Filed: Feb. 3, 1989

[51] Int. Cl.⁵ .............................................. G06F 13/14
[52] U.S. Cl. ........................... 395/725; 364/DIG. 1; 364/241.9; 364/242.6; 364/259.2; 364/937.01; 364/947.2; 395/650
[58] Field of Search ... 364/200 MS File, 900 MS File; 395/725, 650

[56] References Cited

U.S. PATENT DOCUMENTS

| | | | |
|---|---|---|---|
| 435,766 | 3/1984 | Haber et al. | 395/725 |
| 3,593,300 | 7/1971 | Driscoll, Jr. et al. | 364/200 |
| 4,281,381 | 7/1981 | Ahuja et al. | 364/200 |
| 4,384,324 | 5/1983 | Kim et al. | 364/200 |
| 4,387,427 | 6/1983 | Cox et al. | 364/200 |
| 4,481,572 | 11/1984 | Ochsner | 364/200 |
| 4,541,043 | 9/1985 | Ballegeer et al. | 364/200 |
| 4,633,394 | 12/1986 | Georgiou et al. | 364/200 |
| 4,648,061 | 3/1987 | Foster | 364/900 |
| 4,794,516 | 12/1988 | Auerbach et al. | 364/200 |
| 4,814,974 | 3/1989 | Narayanan et al. | 364/200 |
| 4,858,173 | 8/1989 | Stewart et al. | 364/900 |
| 4,881,195 | 11/1989 | Delong et al. | 364/900 |
| 4,920,486 | 4/1990 | Nielsen | 364/200 |
| 4,922,413 | 5/1990 | Stoughton et al. | 364/200 |
| 4,941,084 | 7/1990 | Terada et al. | 364/200 |

OTHER PUBLICATIONS

B. W. Wah, "A Comparative Study of Distributed Resource Sharing on Multiprocessors," The 10th Annual Int. Symposium on Computer Architecture, Stockholm, Sweden, 1983, pp. 301-308.

A. V. Maksimenkov, "Distribution of Tasks Among the Units of a Computer Network," Automatic Control and Computer Sciences, vol. 20, No. 2, New York, United States, 1986, pp. 1-8.

*Primary Examiner*—Lawrence E. Anderson
*Assistant Examiner*—Krisna Lim
*Attorney, Agent, or Firm*—Arnold, White & Durkee

[57] ABSTRACT

A system control unit (SCU), adapted to operating a plurality of central processor units (CPUs) in a parallel fashion in combination with at least one input/output (I/O) unit and for allowing the CPUs and I/O units to controllably access address segments of a system memory, arbitrates communication requests received at the SCU ports from the CPUs and I/O units in such a manner that available system resources are optimally used, while at the same time guaranteeing that all requests are granted within a reasonable period of time. Incoming communication requests are stored, and from there these incoming communication requests are selected, on the basis of a pre-defined prioritizing scheme, commands corresponding to requests that are to be arbitrated. For the command corresponding to each request selected for being arbitrated, there is generated a first vector defining all system resources that are required for executing the command. A second vector is generated representative of all system resources that are in fact available at the time of arbitration. The first and second vectors are compared, and the selected command is honored if all corresponding required resources are available; otherwise, the request corresponding to the command is placed on reserved status, and the availability of corresponding required resources for the reserved request is rechecked, and the reserved request is subsequently honored by executing the associated command when corresponding reserved resources become available.

6 Claims, 8 Drawing Sheets

RESOURCE DESIGNATION TABLE

| BIT# | DESIGNATION OF RESOURCE |
|---|---|
| 0 | CMD BUFFER, CPU 1 |
| 1 | CMD BUFFER, CPU 2 |
| 2 | CMD BUFFER, CPU 3 |
| 3 | CMD BUFFER, CPU 4 |
| 4 | CMD BUFFER, MEM UNIT 0, SEGMENT 0 |
| 5 | CMD BUFFER, MEM UNIT 0, SEGMENT 0 |
| 6 | CMD BUFFER, MEM UNIT 1, SEGMENT 1 |
| 7 | CMD BUFFER, MEM UNIT 1, SEGMENT 1 |
| 8 | I/O BUFFER, I/O UNIT 0 |
| 9 | I/O BUFFER, I/O UNIT 1 |
| 10 | DATA PATH SOURCE, CPU 1 |
| 11 | DATA PATH SOURCE, CPU 2 |
| 12 | DATA PATH SOURCE, CPU 3 |
| 13 | DATA PATH SOURCE, CPU 4 |
| 14 | DATA PATH SOURCE, MEM UNIT 0 |
| 15 | DATA PATH SOURCE, MEM UNIT 1 |
| 16 | DATA PATH SOURCE, I/O UNIT 0 |
| 17 | DATA PATH SOURCE, I/O UNIT 1 |
| 18 | INTERRUPT CONTROL 1 |
| 19 | DATA PATH DESTINATION, CPU 1 |
| 20 | DATA PATH DESTINATION, CPU 2 |
| 21 | DATA PATH DESTINATION, CPU 3 |
| 22 | DATA PATH DESTINATION, CPU 4 |
| 23 | DATA PATH DESTINATION, MEM UNIT 0 |
| 24 | DATA PATH DESTINATION, MEM UNIT 1 |
| 25 | DATA PATH DESTINATION, I/O UNIT 0 |
| 26 | DATA PATH DESTINATION, I/O UNIT 1 |
| 27 | INTERRUPT CONTROL 2 |
| 28 | DATA PATH CROSSING 1 |
| 29 | DATA PATH CROSSING 2 |
| 30 | ADDRESS PATH |
| 31 | MICROCODE QUEUE |

Fig. 5

SYSTEM FOR ARBITRATING COMMUNICATION REQUESTS USING MULTI-PASS CONTROL UNIT BASED ON AVAILABILITY OF SYSTEM RESOURCES

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. NO. 07/306,837 filed Feb. 3, 1989, abandoned, continued in Ser. No. 07/838,806 filed on Feb. 10, 1992; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989, abandoned, continued in Ser. No. 07/646,522 filed Jan. 28, 1991; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989, now U.S. Pat. No. 5,113,515 issued on May 12, 1992; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., BRANCH PREDICTION, Ser. No. 07/306,760 filed Feb. 3, 1989; Fossum et al., PIPELINED FLOATING POINT ADDER FOR DIGITAL COMPUTER, Ser. No. Ser. No. 07/306,343 filed Feb. 3, 1989, and issued as U.S. Pat. No. 4,994,996 on Feb. 19, 1991; Grundmann et al., SELF TIMED REGISTER FILED, Ser. No. 07/306,445 filed Feb. 3, 1989, now U.S. Pat. No. 5,107,462 issued on Apr. 12, 1992; Beaven et al., METHOD AND APPARATUS FOR DETECTING AND CORRECTING ERRORS IN A PIPELINED COMPUTER SYSTEM, Ser. No. 07/306,828 filed Feb. 3, 1989 and issued as U.S. Pat. No. 4,982,402 on Jan. 1, 1991; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989, now U.S. Pat. No. 5,067,069 issued on Nov. 19, 1991; Webb. Jr. et al., PROCESSING OF MEMORY ACCESS EXCEPTIONS WITH PRE-FETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989, and issued as U.S. Pat. No. 4,985,825 on Jan. 15, 1991; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989, now abandoned, and continued in Ser. No. 07/746,007 filed Aug. 9, 1991; Hetherington, WRITE BACK BUFFER WITH ERROR CORRECTING CAPABILITIES, Ser. No. 07/306,703 filed Feb. 3, 1989, and issued as U.S. Pat. No. 4,995,041 on Feb. 19, 1991; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989 and issued as U.S. Pat. NO. 5,043,874 on Aug. 27, 1991; Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989, abandoned, continued in Ser. No. 07/582,493 filed Sep. 14, 1990.

TECHNICAL FIELD

This invention relates generally to multi-processor computer systems in which a system control unit (SCU) is used for operating a plurality of central processor units (CPUs) and other system units in a parallel fashion. More particularly, this invention relates to an arbitration scheme permitting an SCU in a multi-processor system to efficiently arbitrate communications requests from various system ports, particularly between the CPUs, the input/output units, and the system memory.

DESCRIPTION OF RELATED ART

The techniques of multi-processing, in which a plurality of processors are adapted to operate on defined tasks through problem decomposition, and parallel processing, wherein computer instructions are divided into a series of smaller and less complex operations which are subsequently executed in a pipeline fashion by dedicated functional units optimized for specific purposes, are commonly used in high performance computers. In such computer systems high execution speeds and operational redundancy are achieved by means of multiple communication paths provided between the plurality of processor units and input/output units along with parallel paths to mass storage and other devices.

In a multi-processing system the parallel operation of the plurality of CPUs in conjunction with the system memory, input/output devices, and other units of the computing system is typically coordinated by a system control unit (SCU) which links all system units ported into it and provides inter-unit communication for efficient exchange of data and related control signals. The SCU keeps all system components active while avoiding inter-unit conflicts and essentially functions to service requests for communications between the system memory and the system units linked through the various ports on the SCU. As successive communication requests arrive at the SCU, it becomes critical that the requests from various ports be processed in a manner that not only makes the most efficient use of system resources toward facilitating parallel operation but also ensures that each requesting port be treated fairly by having its request processed within a reasonable period of time. These requirements, i.e., system efficiency and unit fairness, are inherently conflicting and obtaining an optimum compromise between the two is a formidable task in implementing efficient arbitration schemes.

Conventional arbitration schemes tend to be inefficient in providing a reasonable response period and breakdown when used in multi-processor systems as a result of bottlenecks created by backed-up communication requests. For instance, a "round-robin" scheme in which all requests are processed according to their time of arrival at the SCU can ensure fair arbitration; however, such a scheme is very inefficient in utilization of system resources because a request that is at the top of the arbitration queue effectively shuts out requests that are behind it until all resources required by the leading request are available, regardless of the fact that resources required by subsequent pending requests may in fact be available.

Consider, for example, the case of access to a memory comprising a plurality of memory segments which are capable of being cycled independently. Under the "round-robin" approach, if two requesting ports A and B, of which request A is ahead of B in the arbitration queue, are pending at the SCU and request A requires access to a memory segment that is busy at the moment while request B requires use of a memory segment that is available at the time, request B is unnecessarily shut out from being serviced until the time when the memory segment requested by request A is free so that request A may first be serviced. The average response time per communication request is unduly increased and this scheme is not conducive to parallel operation.

Another possibility is to use the so-called "instantaneous execution" scheme of arbitration in which communication requests arriving at the SCU are polled sequentially and requests requiring non-available resources at the time of polling are ignored while a sequentially occurring request for which resources are available is processed instantaneously. Although such an approach makes efficient utilization of system resources available at any given time, it is impractical in that a request can be completely shut out if all resources required by the request are found to be unavailable each time that request is polled as part of the arbitration sequence.

SUMMARY OF THE INVENTION

An efficient arbitration scheme through which communication requests from various system units in a multi-processing system are arbitrated for optimal use of available resources, while at the same time ensuring that all such requests are honored within a reasonable period of time, is based upon the concept of identifying all resources that are needed to fulfill incoming communication requests at the time of arbitration, honoring requests for which all required resources are available, bypassing requests for which required resources are not available after reserving the non-available required resources, and proceeding with arbitration by alternately polling subsequent new requests and requests that have reserved resources associated with them.

The arbitration system operates in conjunction with a pair of resource vectors: 1) a resources required (RR) vector representing all resources that are required to execute a command accompanying an outstanding request at the time of arbitration; and 2) a resources available (RA) vector representing all resources that are available at the time of polling. Identification of requests for which required resources are available at the time of arbitration is accomplished by comparing the two resource vectors. If the vectors are found to match it is an indication that all required resources are available. If the resource vectors do not match, it is an indication that at least some of the resources required are not available and the subject request is put on reserve. A similar matching is performed when a reserved request is arbitrated; however, in this case, when the vectors do not match all corresponding required resources are put on reserve by storing the RA vector so that the resources may be made unavailable to subsequent requests.

Briefly, in accordance with the arbitration scheme of this invention, all units that are ported into the SCU (i.e., all SCU ports) are polled sequentially and requests are initially arbitrated according to a predefined hierarchical prioritizing scheme for prioritizing requests arriving at the SCU. In the first pass of the polling sequence, all requests that can be honored are done so while requests requiring unavailable resources are put on a reserved status. In the subsequent pass all reserved requests from the previous pass are polled again to see if the corresponding reserved resources are available at the time. Any reserved requests for which the required resources have since become available are honored. Reserved requests for which required resources are still unavailable are retained on a reserved status; in addition, the corresponding resources are stored as reserved resources to generate a summary of reserved resources which are made unavailable to subsequent requests. During the third pass, any new requests that have been lodged since the previous polling and for which required resources are available are honored. However, no reservation of resources is performed as part of the third pass. This alternate polling of "reserved" and "new" requests is continued in subsequent passes until all reserved requests have been honored, i.e., until none of the system resources are on reserve status, at which point a new summary of reserved requests is initiated.

As will be explained in detail below, the above arbitration scheme operates in a non-stop manner because arriving communication requests are continuously processed without allowing a particular request from unnecessarily preventing arbitration of following requests. By ensuring that all requests reserved as part of an arbitration pass are honored before initiating reservation of resources for subsequent requests, the arbitration scheme prevents a requesting unit from being locked out.

In implementing the arbitration scheme of this invention according to a preferred embodiment, command transformer means are used to store a directory of all communication commands capable of being processed by the system, with each entry in the directory being indexed to a corresponding list of all resources required for executing the particular command. All incoming requests at the SCU are stored within prioritizing means which accepts incoming requests in a sequential order and makes available at its output a single request which is assigned the highest priority among all stored requests on the basis of a predefined prioritizing scheme. Commands associated with incoming communication requests are stored within command buffer means. A multiplexer arrangement indexed by the request selected by the prioritizing means is used to feed the command corresponding to the selected request to the command transformer means which, in response thereto, is adapted to generate a resource vector indicative of all resources required for processing the command.

The SCU is provided with means for maintaining an updated record of resources available at the time of arbitration in order to generate a vector of available resources. This vector is compared, by means of a comparator arrangement, with the resource vector corresponding to the currently outstanding request, as determined by the prioritizing means, to determine whether or not all resources required for executing the command associated with the request being arbitrated are available. If the two resource vectors are found to match, the comparator output causes the selected request to be honored. However, if the resource vectors do not match, the comparator arrangement causes the SCU port corresponding to the requesting unit which initiated the communication request to be flagged as being on a reserved status. When a reserved request is being arbitrated the vector of required resources is again compared with the current vector of available resources. If the vectors still do not match, the comparator output causes the vector of required resources to be stored in a resource reservation vector; if the vectors do match, the reserved request is honored and taken off the list of reserved requests. The cyclic operation of this physical arrangement is based upon the arbitration scheme summarized above and will be described in detail below.

BRIEF DESCRIPTION OF THE DRAWINGS

Other objects and advantages of the invention will become apparent upon reading the following detailed description and upon reference to the drawings in which:

FIGS. 2A, 2B, and 3C are flowcharts illustrating the sequential procedure on which the arbitration scheme of this invention is based;

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 1:
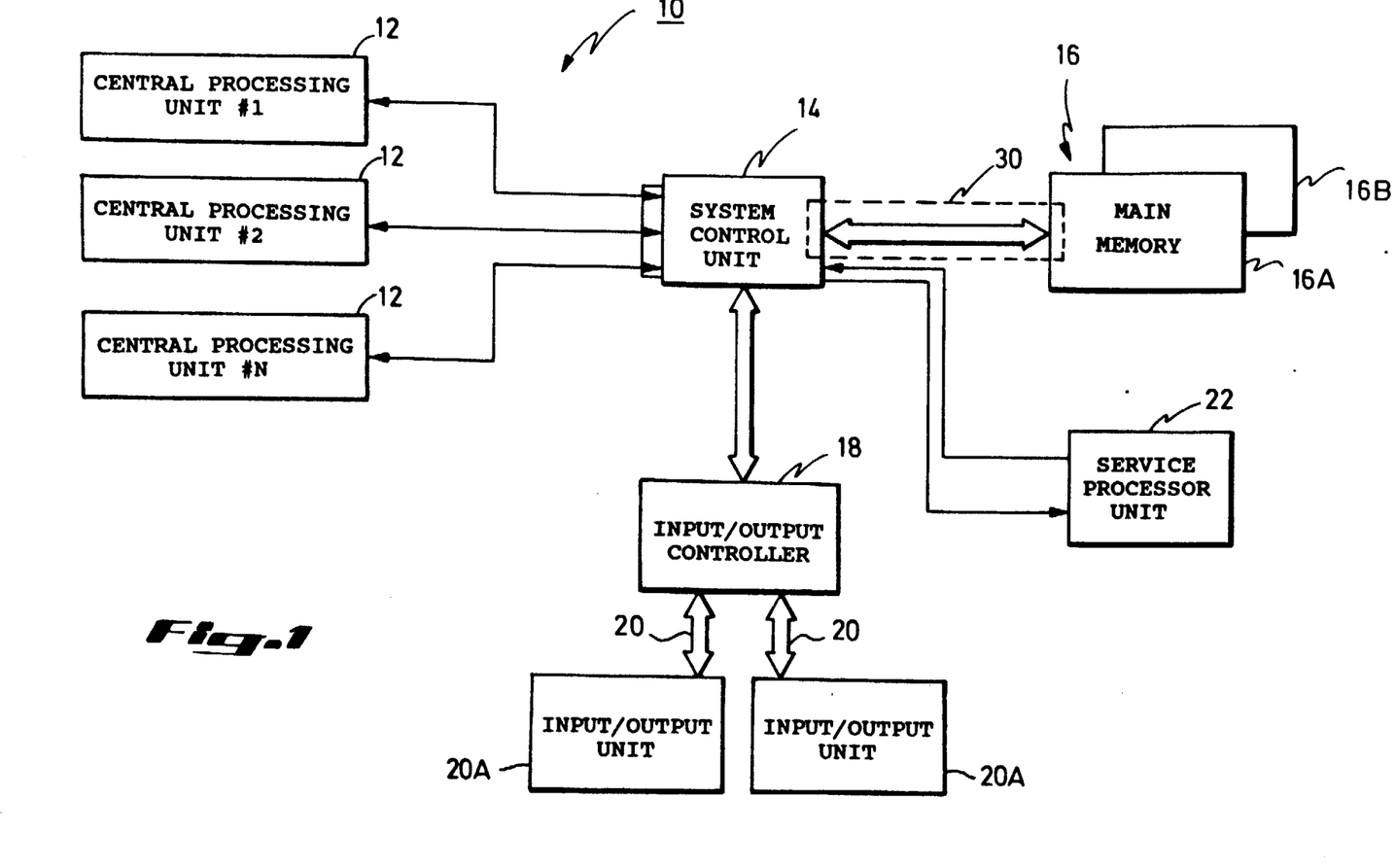
FIG. 1 is a block diagram illustrating a multi-processor computer system using a system control unit (SCU) for operating a plurality of processors and input/output units in which the arbitration scheme of this invention may be effectively used.

Turning now to the drawings and referring in particular to FIG. 1, there is shown a simplified block diagram of a multi-processing system 10 which uses a plurality of central processing units (CPUs) 12 and is adapted to permit simultaneous, i.e., parallel, operation of the system CPUs by allowing them to share a common memory 16 for the system. The main memory 16 itself typically comprises a plurality of memory units 16A and 16B. A system control unit (SCU) 14 links the CPUs 12 to the main memory 16 and to an input/output (I/O) controller 18. The I/O controller allows the processing system in general and the CPUs in particular to communicate with the external world through appropriate I/O interfaces 20 and associated I/O units 20A for the system. The SCU 14 may also link the various system modules to a service processor/console unit (SPU) 22 which regulates traditional console functions including status determination and control of the overall operation of the processing system.

In the multi-processing system of FIG. 1, efficient communication between system units linked through the SCU 14 and the main memory 16, and more particularly between each system CPU 12 and the individually addressable segments comprising each memory unit 16A, 16B is handled through dedicated interface means 30. The specific configuration of the main memory and the particular manner in which the SCU is interfaced to the memory is not important to the present invention and accordingly will not be discussed in detail herein. Reference is hereby made to the above referenced co-pending Gagliardo et al. U.S patent application Ser. No. 07/306,326 filed Feb. 3, 1989, now abandoned, continued in Ser. No. 07/646,522 filed Jan. 28, 1991, titled "Method And Means For Interfacing A System Control Unit For A Multi-Processor System With The System Main Memory", also owned by the assignee of the present invention, incorporated herein by reference, for details on preferred interface means. For purposes of describing the present invention, it suffices to state that each memory unit 16A, 16B of the main memory 16 is preferably split between two memory ports on the SCU with each port being linked to two individually addressable segments and all segments being interleaved on block boundaries, as described in detail in the aforementioned co-pending application.

Each system unit, such as a CPU or an I/O unit, is ported into the SCU 14 through a discrete port and all communication requests between memory, and more specifically, access requests between memory and the system units, are lodged at the corresponding port on the SCU. The SCU 14 functions to keep system units active while avoiding inter-unit conflicts by handling requests for communications between the system unit and the system memory that are received at various ports on the SCU. Because the various CPUs and I/O units are operated in a parallel fashion within the multi-processing system, a plurality of communication requests are routinely received at the SCU. In addition, a number of such requests may typically require access to the same system resources in order to honor the requests by executing the commands associated therewith.

It is accordingly an important function of the SCU to process requests received at its ports from the system units in a fashion that utilizes the system resources in the most efficient manner and in addition treats each arriving system request in a fair manner by processing the request within a reasonable period of time. More precisely, the technique on the basis of which the SCU arbitrates requests from system units which are outstanding at its ports in order to achieve the dual requirements of system efficiency and unit fairness is one of the primary factors that affect the overall operating efficiency of the processing system. As discussed above, conventional arbitration schemes, based, for instance, on the "round-robin" approach or the "instantaneous execution" approach are unsatisfactory for use in multi-processing systems because they fail to provide efficient utilization of system resources in combination with a reasonable response period in the arbitration of communication requests.

In accordance with the present invention, a novel arbitration scheme is provided which can be used by an SCU in efficiently arbitrating requests from system units in a multi-processing system of the type described above in relation to FIG. 1. The arbitration scheme is based upon the concept of identifying all system resources that are needed to honor incoming communication requests by execution of associated commands, honoring requests for which all required resources are available at the time of arbitration, placing on reserved status requests for which all required resources are not available at the time of arbitration, reserving the corresponding required resources when a reserved request cannot be honored, and proceeding with arbitration by alternately polling previously reserved requests having reserved resources associated with them and subsequently received new requests and honoring requests for which required resources are or have become available.

In order to identify all resources that are required to honor incoming requests, the arbitration system of this invention utilizes in conjunction a pair of system-generated resource vectors as below:

1) a resources required (RR) vector identifying all system resources that are required to execute a command accompanying a selected request at the time of arbitration; and
2) a resources available (RA) vector identifying all system resources that are in fact available at the time of arbitration.

In order to identify those requests for which all required resources are available at the time of arbitration, the two resource vectors RR and RA are compared. If the resource vectors are found to match, it is a clear indication that all required resources are available. If the resource vectors do not match, it is an indication that at least some of the resources required for executing the corresponding command are not available at the time, thereby indicating that the subject request is incapable of being honored at the time. Accordingly, an incoming request is executed when the vectors match and placed on reserve when the vectors do not match. If the resources required for executing a reserved request are found to be unavailable, i.e., if the RR vector for a reserved request and the RA vector do not match, they are put on reserve so that these resources may be appropriated for honoring reserved requests as soon as they become available. The RA vector is concurrently adjusted to reflect the reserved status of these resources by making the reserved resources unavailable to subsequent requests.

The following description will focus upon the sequential procedure on which the arbitration scheme of this invention is based. Arbitration is based upon the sequential polling of all SCU ports which are available for lodging of communication requests from corresponding system units. Incoming requests are collected during the polling routine and stored for subsequent arbitration. Selection of requests for arbitration from the stored request directory is based on a simple hierarchical scheme which, according to a preferred embodiment, prioritizes multiple requests at a given port on a first-come first-arbitrated basis related to the time of arrival of requests at the port and further prioritizes all requests collected during a given polling routine on the basis of a predefined prioritizing hierarchy.

According to a feature of this invention, the arbitration sequence utilizes three separate arbitration passes, each pass comprising the selection and arbitration of all requests collected during a single polling routine. More specifically, during a first pass of the polling sequence (the "reserve" pass), requests for which all required resources corresponding to the associated command are available at the time of arbitration are honored. Also, during the reserve pass, requests for which less than all of the required resources are available are placed on a reserved status for further arbitration.

In the subsequent arbitration pass (the "recheck" pass), only those requests which have been reserved in the foregoing reserve pass are arbitrated by honoring those reserved requests for which corresponding reserve resources have become available since the time the requests were put on reserve status. Also, during the recheck pass, those reserved requests for which the required resources corresponding to the associated command are still unavailable are retained on a reserved status; in addition, the corresponding required resources, as represented by the corresponding RR vectors, are placed on reserve as a summary of reserved resources.

During the third arbitration pass (the "non-reserve" pass) only those new requests that have been lodged with the SCU since the previous polling routine are arbitrated by honoring requests for which all corresponding required resources are available. However, no reservation of resources is performed as part of the third pass. This alternate polling of "reserved" and "new" requests is continued in subsequent passes until all reserved requests resulting from the initial reserve pass have been honored. At this point there are no outstanding reserved requests, and the identification of non-executable requests that need to be reserved and the generation of the summary of associated reserved resources is initiated anew by performing a fresh reserve pass followed again by the alternate execution of recheck and non-reserve passes as arbitration proceeds.

Figure 2A:
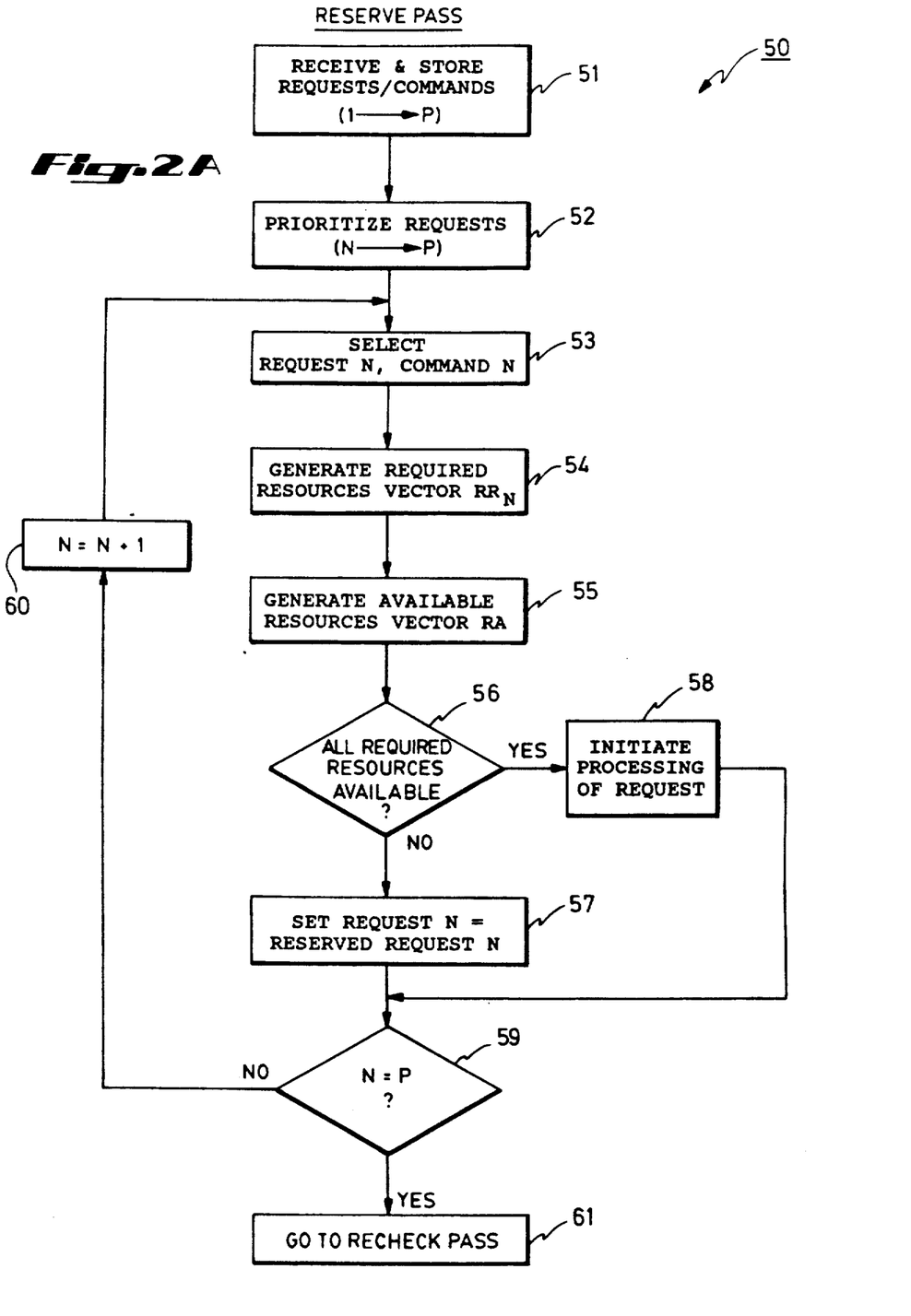
Figure 2B:
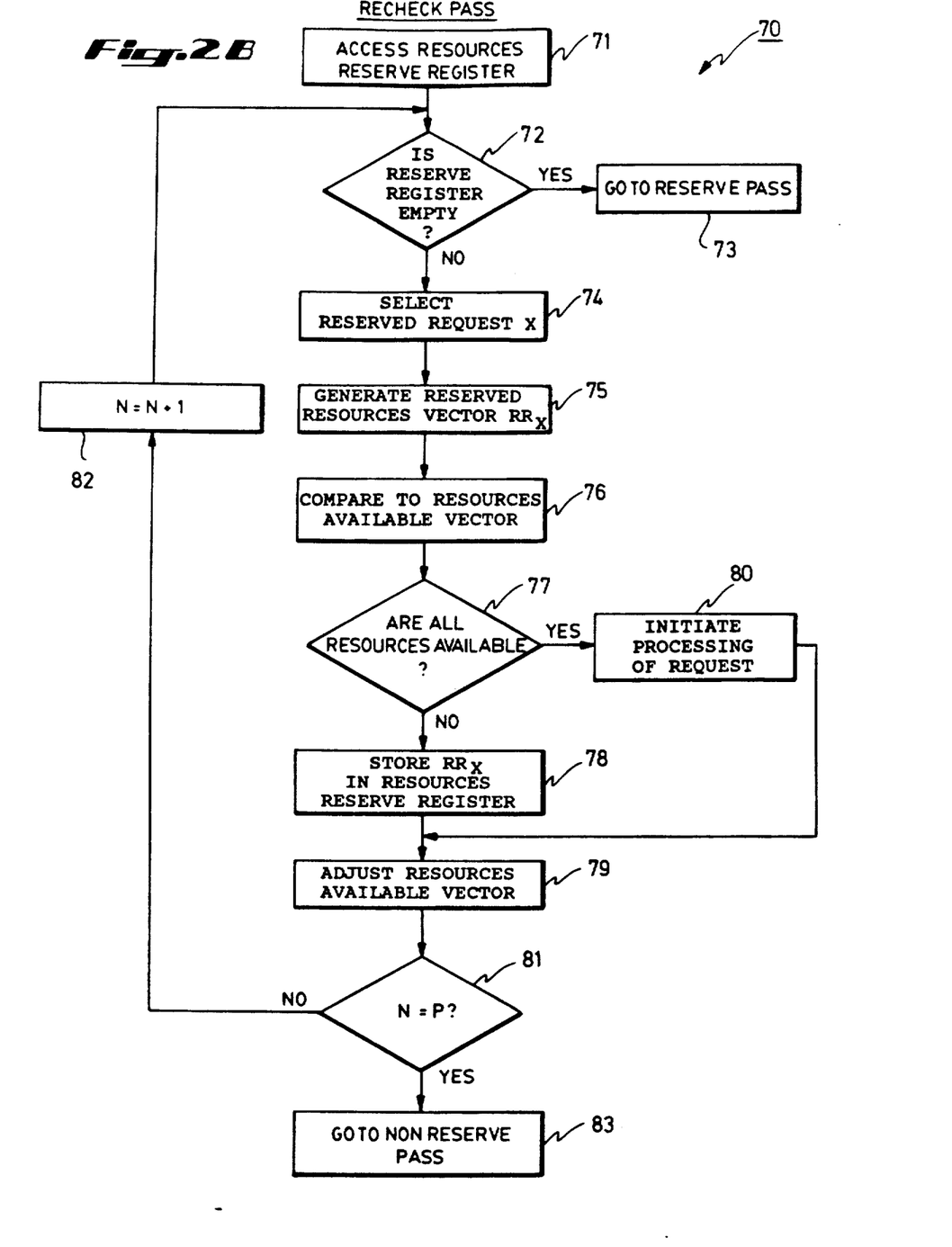
Figure 2C:
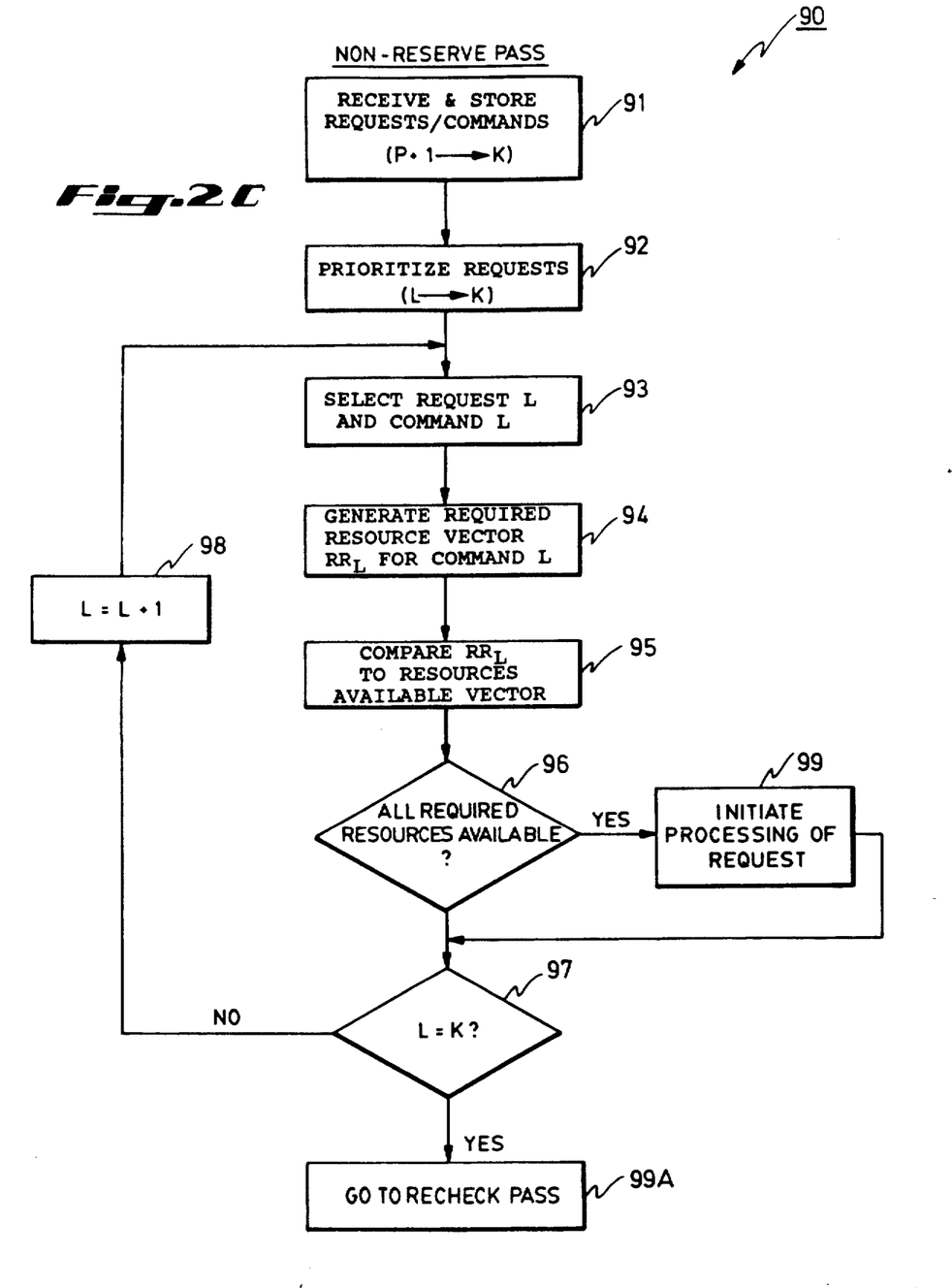

A more detailed explanation of the various procedural steps involved in executing the three arbitration passes according to the arbitration scheme of this invention is now provided with reference to FIGS. 2A, 2B, and 2C. Referring in particular to FIG. 2A, there is shown a flow diagram 50 for the reserve pass. As shown therein, at the first step 51, requests from polled ports of the SCU are received and stored along with the associated commands. Assuming, for illustrative purposes, that the number of units ported into the SCU and accordingly the number of SCU ports is equal to "P", and assuming that all ports have a single communication request lodged therein, the number of requests and commands collected for arbitration by the SCU during a single polling routine is also equal to "P". At step 52, the stored requests are prioritized on the basis of the selected hierarchical prioritizing scheme beginning with, say, a topmost priority of "N".

At the following step 53, the request REQN with the topmost priority at the time is next selected for arbitration and the corresponding stored command CMDN is extracted. At step 54, the required resource vector RRN corresponding to the selected command is generated. In the following step 55, the resources available vector RA is generated and subsequently, at step 56, the two resource vectors are compared to determine if all resources required by the selected command are available at the time. If the answer at step 56 is negative, the subject request REQN is put on a reserved status at step 57.

If the answer at step 56 is positive, i.e., all resources required by the request being arbitrated are in fact available, step 58 is accessed where the arbitration scheme initiates the processing of the request. The execution of either of steps 57 and 58 leads to step 59 where a check is made to see if all requests collected from the SCU ports have been arbitrated. If the answer at step 59 is negative, step 60 is accessed where the prioritizing parameter N is incremented before returning to step 53 of the reserve pass sequence so that the outstanding request having the highest priority at the time is selected for arbitration. The above-described flow sequence is reiterated until all prioritized requests have in fact been arbitrated, at which point the answer at step 59 is positive and step 61 is accessed where the recheck pass of the arbitration scheme is initiated.

FIG. 2B represents a flow diagram representing the procedural sequence involved in executing the recheck pass of the arbitration scheme according to this invention. The recheck pass 70 is initiated at step 71 and involves the sequential arbitration of requests that have been stored therein under a reserved status during the initial reserve pass. At step 72 a check is performed to determine if the reserve register is empty, i.e., to determine whether or not all requests placed on reserve status as part of the initial reserve pass have subsequently been honored so that there are no outstanding reserved requests at the time. If the answer is found to be positive, step 73 is accessed where arbitration is proceeded with by returning to the reserve pass. Otherwise, step 74 is accessed where the required command CMDX corresponding to the most outstanding reserved request RREQX is selected for arbitration. It is assumed for illustrative purposes that "Q" reserved requests need to be arbitrated and the suffix "X" designates the most outstanding reserved request at the time of arbitration. At step 75 the corresponding required resource vector RRX is generated.

Subsequently, at step 76, the vector RRX is compared to the resources available vector RA. At step 77, a determination is made as to whether or not all resources required for honoring the selected request are available at the time. If the answer at step 77 is negative, all required resources corresponding to the request REQX, as represented to the vector RRX, are stored in the resource reserved register at step 78. Subsequently, step 79 is accessed where the resources available vector RA is adjusted to make the reserved resources represented by the vector RRN unavailable to subsequent requests.

However if the answer at step 77 is found to be positive, step 80 is accessed where the processing of the selected request is initiated before returning to the flow sequence at step 79 where the resources available vector RA is correspondingly adjusted. Next, step 81 is accessed where a test is performed to determine whether or not all outstanding reserved requests have been arbitrated. If the test at step 81 results in a negative answer, the reserve status-indicating parameter X is incremented at step 82 and the flow sequence is reentered at step 72 so that the most outstanding reserved request at the time may next be selected for arbitration. On the other hand, if the test at step 81 provides a positive result, i.e., all outstanding reserved requests have in fact been arbitrated, the flow sequence moves on to the non-reserve pass at step 83.

Turning now to FIG. 2C, there is illustrated a flow diagram defining the sequence involved in the non-reserve pass according to the arbitration scheme of this invention. The non-reserve pass 90 is initiated at step 91 where all commands received at the SCU ports from requesting system units subsequent to the previous reserve pass or outstanding requests at the ports other than those picked for arbitration in the reserve pass are collected and stored along with associated commands. For illustrative purposes, it is assumed that the total number of requests/commands that need to be arbitrated in the non-reserve pass is "K". At the following step 92, the stored requests are prioritized on a basis similar to that used in the prioritizing step 52 of the reserve pass (FIG. 2A).

At step 93, the request REQL having the highest outstanding prioritizing level (designated here as "L" for illustrative purposes) and the corresponding command CMDL are selected for arbitration. At the following step 94, the required resources vector RRL corresponding to the selected command is generated and compared at step 95 to the resources available vector RA. At step 96, a determination is made as to whether or not all resources required for executing the selected command are available. If the answer at step 96 is negative, step 97 is accessed where a determination is made as to whether or not all prioritized requests have been arbitrated. If the answer at step 97 is negative, the prioritizing parameter L is incremented at step 98 and the flow sequence is reentered at step 93 so that the request having the highest priority at the time is next selected for arbitration.

However, if step 96 reveals that all required resources are in fact available, step 99 is reached where the processing of the selected request is initiated and the flow sequence is subsequently reentered at 97 to determine if all prioritized requests have been arbitrated. The above sequence of events is reiterated until a positive answer is generated at step 97 indicating that all prioritized requests have in fact been arbitrated and subsequently the sequence returns to the recheck pass which is initiated at step 99A.

Figure 3:
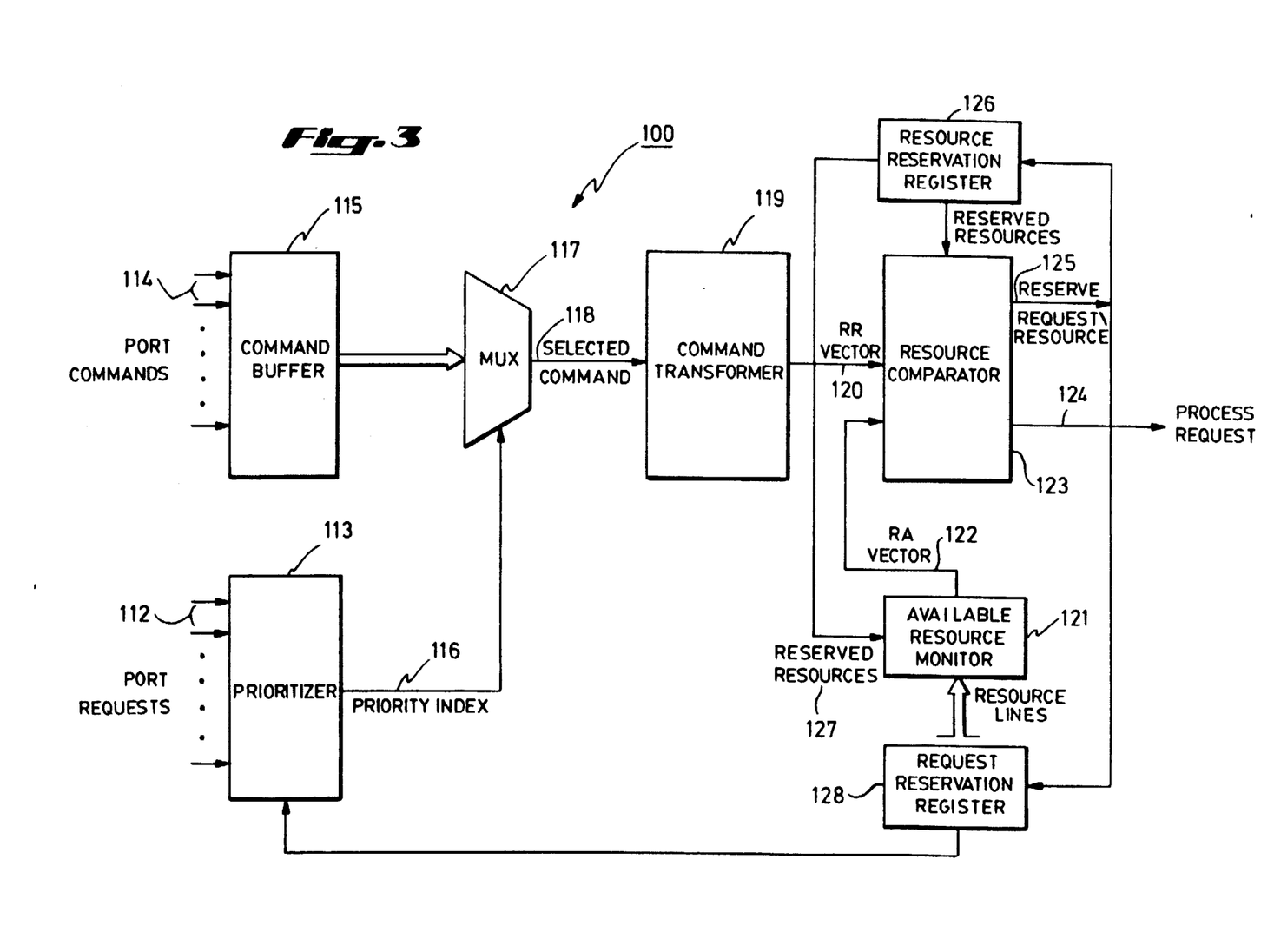
FIG. 3 is a block diagram of preferred means for implementing the arbitration scheme of FIG. 2 in a multi-processor system of the type shown in FIG. 1.

Referring now to FIG. 3, there is shown a simplified block diagram illustrating a preferred arrangement 100 for implementing the arbitration scheme of FIG. 2 and adapted for use in a multi-processing system of the type shown in FIG. 1. Incoming requests 112 at the SCU ports are stored within prioritizing means 113 while corresponding commands 114 associated with incoming requests are accepted and initially stored in a separate command buffer 115. The stored commands are subsequently transferred from buffer 115 to a multiplexer 117 which is adapted to accept a priority index signal 116 from the prioritizer means 113 and in response thereto put out a corresponding stored command as the selected command 118.

According to a feature of this invention the prioritizer means 113 functions upon a hierarchical selection scheme based on selecting the request which is most outstanding in terms of time of arrival at the SCU port when multiple requests arrive at a given port, and upon selecting, from such outstanding requests collected from all SCU ports, a single request based on a predefined hierarchy of request-originating sources. More specifically, the hierarchy for assigning priorities is keyed to the particular system unit originating a communication request; in such a scheme, the highest priority is preferably awarded to requests originating from memory, while requests from I/O units are awarded a relatively lower priority, and finally, requests originating from CPUs are awarded the lowest priority.

The arbitration technique of this invention and its implementation is best understood by considering the SCU port configuration according to a preferred embodiment of this invention wherein the SCU is adapted to arbitrate communication requests from four CPUs, two memory units, and two I/O units. Accordingly, at least eight ports are provided on the SCU for accepting requests and associated commands from corresponding system units. Further, each of the SCU ports is adapted to receive and have lodged therein a plurality of communication requests from the corresponding system unit. Communication requests that are granted priority, for example, cause data transmission paths through the SCU to be reserved for specified time periods, as further described in the above referenced Chinnasway et al U.S. patent application Ser. No. 07/306,336, Filed Feb. 3, 1989, and issued as U.S. Pat. No. 4,968,977 Nov. 6,1990, entitled "Modular Crossbar Interconnection Network For Data Transmission Between System Units In A Multi-Processor System," incorporated herein by reference.

Preferably the SCU is adapted to have up to three requests outstanding at every CPU port in the SCU and up to two requests for each I/O unit and each memory unit port in the SCU so that up to 20 requests may be outstanding at a given time at the SCU ports for being processed by the prioritizer means. Similarly, up to 20 corresponding incoming commands need to be stored and the command buffer 115 is accordingly provided with the capacity to accomplish this.

Figure 4:
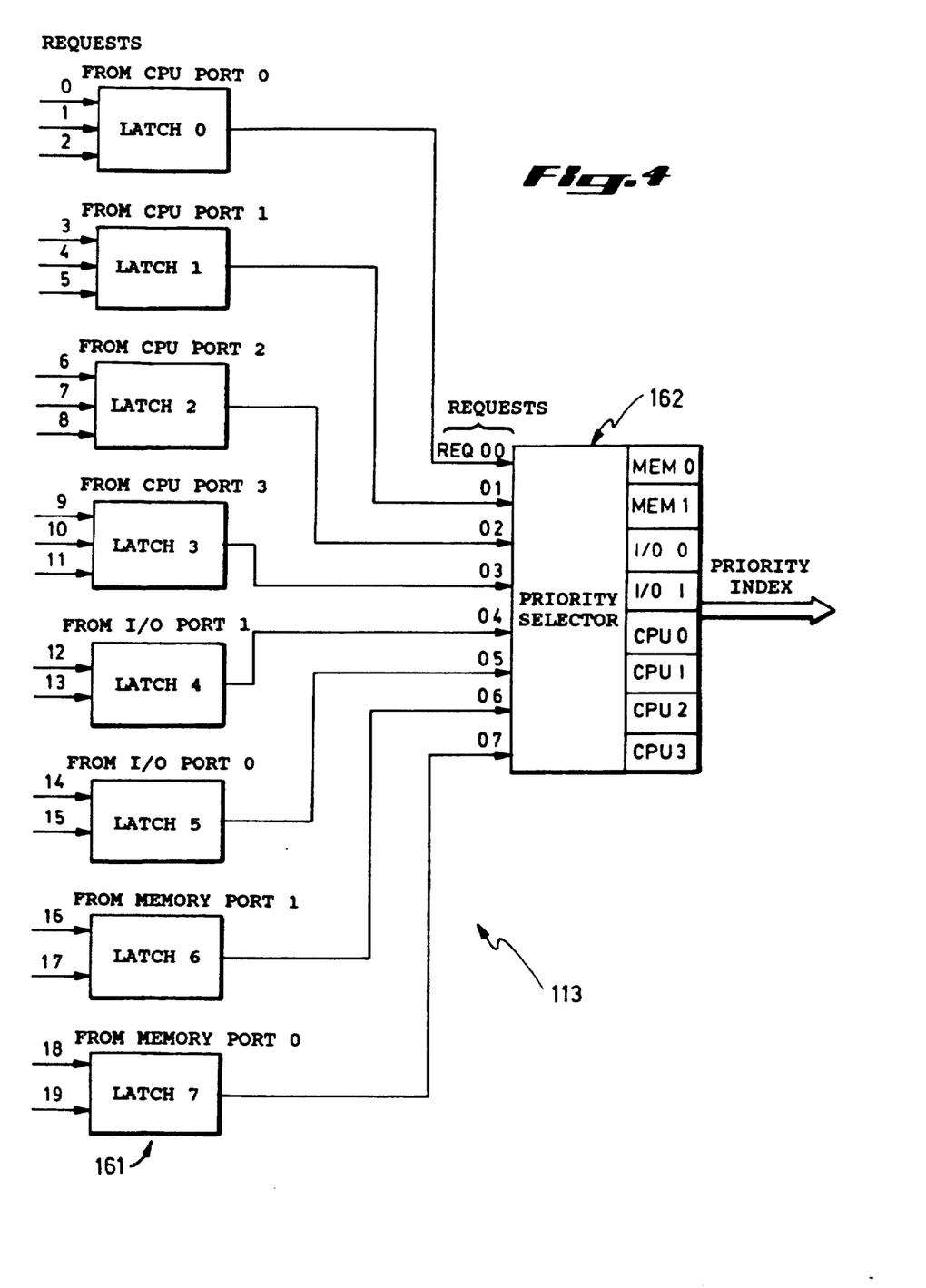
FIG. 4 is a schematic diagram illustrating an arrangement for implementing the preferred hierarchical prioritizing scheme for selection of requests for arbitration.

FIG. 4 shows a preferred arrangement for the prioritizer means 113 for accepting up to 20 incoming requests (REQ 0-REQ 19) at the SCU ports in order to prioritize them appropriately for selecting a single request for arbitration. The arrangement 160 includes a series of latches 161 for accepting incoming requests from eight SCU ports comprising four CPU ports (CPU port 0, CPU port 1, CPU port 2, and CPU port 3) for the four CPUs 1-4, two I/O ports (I/O port 0 and I/O port 1) for the two I/O units, and two memory ports (MEM port 0 and MEM port 1) for the two memory ports. More specifically, a single latch is provided by for each SCU port where communication requests to and from the associated system unit may be received. Latch 0, for instance, corresponds to CPU port 0 which is adapted to receive requests REQ 0, REQ 1, and REQ 2 to and from CPU 1.

The maximum number of incoming requests that are allowed to be stored at a CPU port, which in this case is three, are latched into latch 0 in serial order so that a request that arrives first at the port constitutes the most outstanding request at a given time and is latched out as the particular request REQ 00 collected from CPU port 0. This type of selection continues at the remaining three latches that correspond to SCU ports 1, 2, 3 which correspond respectively to CPUs 2, 3, and 4. Latch 3, for instance, corresponds to CPU port 3 and is instrumental in accepting the three requests possibly lodged at CPU port 3, i.e., REQ 9, REQ 10, and REQ 11 in order to select the most outstanding of the accepted requests as REQ 03 for further arbitration.

On a similar basis latches 4, 5 are provided in correspondence with SCU ports 4, 5 for I/O units 0, 1, respectively. More specifically, latch 4 accepts two requests, REQ 12 and REQ 13, from I/O port 0 in order to select the most outstanding of the two as REQ 04. Similarly, latch 5 accepts two requests REQ 14 and REQ 15 from I/O port 1 in order to select one of the two requests as the outstanding request REQ 05.

Similarly, latches 6, 7 are respectively provided in correspondence with SCU ports for the two memory units 0, 1 that support the system. Latch 6 in particular accepts two requests REQ 16 and REQ 17 from memory port 1 for selecting therefrom the most outstanding 1 request as REQ 06. Latch 7 accepts requests REQ 18 and REQ 19 from memory port 0 and selects the most outstanding of the two requests as REQ 07.

In effect, the arrangement using the eight latches 161 corresponding to the eight SCU ports functions to select the most outstanding request at each SCU port in order to collect up to eight requests; this sequence of polling each of the eight SCU ports to collect a single outstanding request for each port constitutes a single polling routine. The selected requests REQ 00-REQ 07 are fed to a priority select network 162 which constitutes a simple logic arrangement for picking a particular request on the basis of a predefined hierarchy of prioritizing levels.

As described above, the prioritizing hierarchy is preferably based on assigning the highest priority to requests lodged through memory ports, assigning a relatively lower priority to requests originating from I/O ports, and assigning the lowest priority to requests originating from CPU ports. More specifically, one of the two memory ports, say memory port 0, is assigned the highest priority so that any time REQ 07 is active, it is assigned the highest priority and is accordingly selected for arbitration. The next level of priority is assigned to REQ 06 from memory port 1. Similarly, successively lower levels of priority are assigned respectively to REQ 05 from I/O port 0, REQ 04 from I/O port 1, REQ 03 from CPU port 3, REQ 02 from CPU port 2, REQ 01 from CPU port 1, and REQ 00 from CPU port 0.

A particular active request is selected for arbitration only if all requests having higher priority levels are inactive. For instance, REQ 04 corresponding to I/O port 1 is selected for arbitration only if REQ 05, REQ 06, and REQ 07 (which have a higher priority level than that of REQ 04) are inactive. Once a particular request has been selected for arbitration on the basis of its priority level, a corresponding priority index is generated as a signal indicative of the particular one of the incoming 20 requests that has been selected for arbitration so that the corresponding command associated with the selected request may be selected for arbitration.

In defining the prioritizing hierarchy it should be recognized that merely providing access to memory pursuant to a request from a system unit, such as a CPU, is of no avail unless provision is made for transferring the requested memory data back to the requesting CPU as soon as the data becomes available from memory, as indicated by a related memory command. It is accordingly important that subsequent CPU requests directed to memory be superseded by memory commands requiring transfer of data to a requesting system unit. This is accomplished by assigning the highest priority to such memory commands. When a plurality of memory units exist, each unit is assigned one of different priority levels each higher than those assigned to the rest of the system units. For instance, in the preferred embodiment which has two independently accessible memory units, memory unit "0" is assigned the highest priority (i.e., 1), while memory unit 1 is assigned the next highest priority (i.e., 2).

Beyond the priority levels for memory units, the next highest levels are accorded to I/O units. This is to avoid conflicts that arise when a CPU, which has already requested an operation of an I/O unit and caused the unit to be engaged in executing the operation, subsequently requests further operations to be performed by the same unit, thereby burdening the I/O unit and preventing an effective I/O response. It is accordingly important that commands originated by I/O units be designated as having higher priority levels than those coming from system CPUs. In the preferred embodiment, for example, system I/O units 0, 1 are assigned priority levels 3, 4, respectively which fall immediately below the priority levels for the two memory units. Finally, the system CPUs are accorded the lowest levels of priority; the four CPUs 1–4 in the preferred embodiment, for instance, are respectively accorded priority levels of 4–7.

Returning now to FIG. 3, the priority index 116 generated by the prioritizer 113 is fed to the multiplexer 117 and functions as a select signal for selecting the particular one of the received commands fed to multiplexer 117 which corresponds to the incoming request 112 having the highest priority.

The selected command 118 is fed to command transformer means 119 for generation of the required resource vector 120 representing all resources that are required to execute the selected command 118. More specifically, the command transformer means 119 includes a table of predefined lists correlating all possible communication commands in general and memory commands in particular that are defined as being executable by the processing system. In order to accomplish this, the communication commands that are most commonly arbitrated by the SCU are preferably divided into categories of commands which require similar sets of required resources for being executed. Typical categories include memory reads, memory writes, I/O reads, and I/O writes, although less common commands such as those which do not require access to memory and I/O units but do require access to the system microcode queue, and commands which do not require access to either the memory, or the I/O units, or the microcode queue for the system may also be categorized. For each command falling under any of these command categories the specific set of system resources that are essential to execution of the command are identified and a table correlating specified commands to corresponding required resources is generated.

It will be understood by those skilled in the art that the arbitration scheme is not restricted to any particular type or category of system resources. Typical resources for execution of common commands include command buffers for system CPUs and memory units, buffers for I/O devices, data path sources for CPUs, memory, and I/O units, data path destinations for CPUs, memory units, and I/O units. In addition, certain specialized resources may also be identified, such as the availability of access to a microcode queue, and data path crossings, when indirectly linked crossbar modules are used for data transfer between system units and memory segments.

Figure 5:
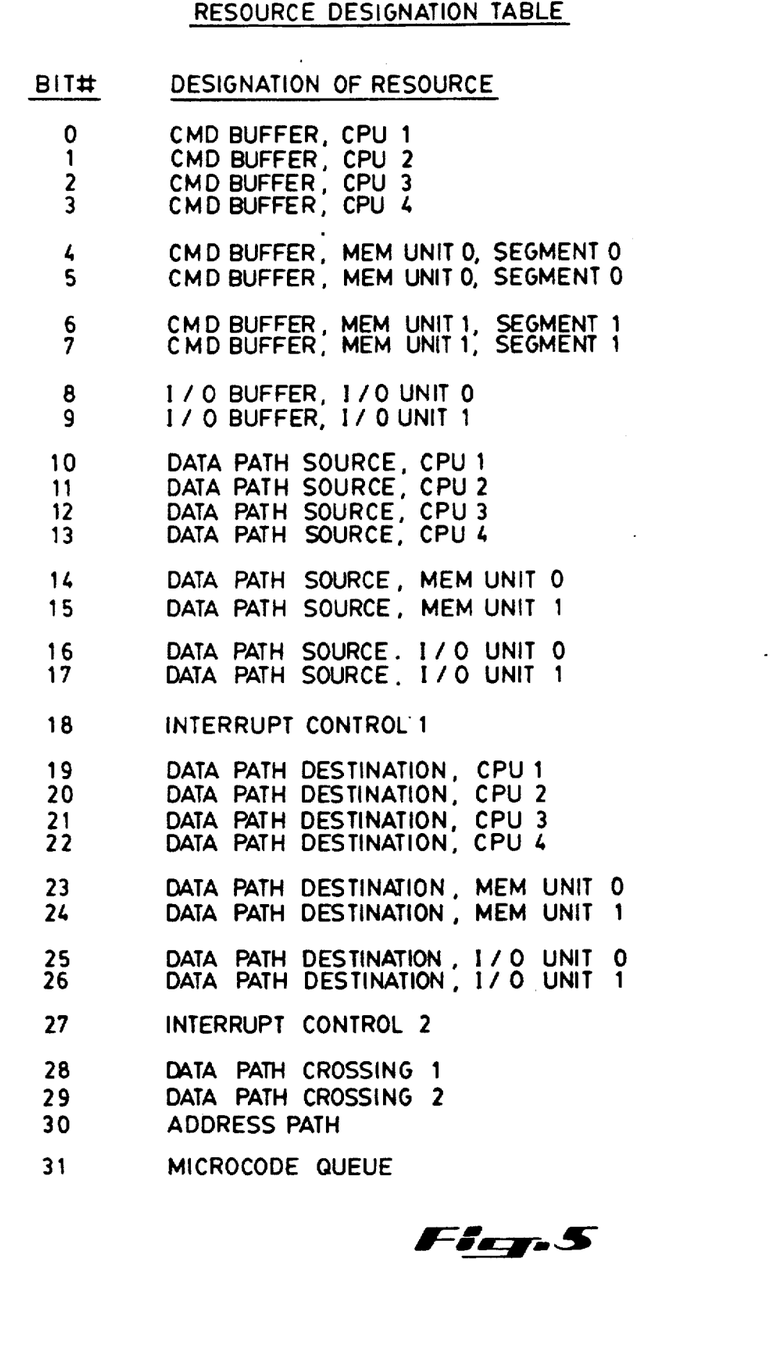
FIG. 5 is a table listing the preferred representation of various system resources that are identified by the resource vectors and used within the command transformer means for generating the required resource vector.

A preferred arrangement for predefining system resources required for execution of a selected command which is conveniently representable in the form of a 32-bit vector is illustrated at FIG. 5. Each of the 32 bits, when asserted, represents a specific system resource that is required for executing a particular system command. In FIG. 5, for instance, bits 0, 1, 2, and 3 respectively represent the CPU command buffers for CPU 1, CPU 2, CPU 3, and CPU 4, while bits 4, 5 and 6, 7 respectively, represent the two command buffers for each segment of the memory units of a system memory comprising two separate, independently accessible, dual-segment memory units, and bits 8, 9 represent the buffers for input/output units 1, 2, respectively, and so on.

For every command preselected as being acted upon by the arbitration scheme, a corresponding RR vector is defined and identifies in the form of a 32-bit word all system resources required to execute the command. The command transformer hence essentially is a means for storing the directory of arbitratable commands along with the corresponding 32-bit RR vectors. Each time a request is selected for being arbitrated. The priority index 116 causes the corresponding command to be extracted from MUX 117 and fed to the command transformers 119, and in response thereto the corresponding stored RR vector is extracted for being compared subsequently with the RA vector.

The arbitration system of FIG. 3 also includes an available resource monitor 121 which provides an instantaneous record of all system resources that are available to be used and generates the vector of resources available (RA) 122 which is fed in combination with the RR vector 120 generated by the command transformer means 119 to resource comparator means 123.

The resource monitor 121 is essentially a module linked directly to each of the system resources (as identified in the resource table of FIG. 5) in order to ascertain the availability of each resource and in response thereto set or clear the corresponding bit in a register storing the available resource vector. The actual physical arrangement involved is not of importance; it is merely required that the resource monitor 121 be linked to each of the predesignated system resources so that it can provide an indication, in a format corresponding to that of the resources required vector (RR), of the system resources which are available at any given time. Preferably the resource monitor is implemented in the form of hard wire links from each designated system resource to a resource available register having at least a single bit corresponding to each system resource; when a particular system resource is in use the corresponding bit in the resource available register is set and the output of the register, accordingly, indicates the availability of system resources and represents the resources available vector RA.

The comparator 123 of FIG. 23 functions to compare the two resource vectors fed to it and generates a "process request" signal 124 if the two vectors RR and RA are found to match, i.e., if all resources required by the selected command 118 are available at the time; the "process request" signal 124 is then available for use by the SCU in executing the selected command in a conventional manner.

The comparator 123 is also adapted to generate a reserve signal 120 which causes the RR vector to be fed to a resource reservation register (RRV) 125 so that the required resources designated by the RR vector may be stored therein if the resource vectors being compared are not found to match. The RRV 125 is also linked to the available resource monitor 121 so that an updated available resource vector RA 112 may be generated therefrom reflecting the non-available nature of the reserved resources designated by the required resource vector 120 stored in the register 125. The reserve signal 120 is also available to be used to cause the subject request to be designated as being on a reserved status and be stored within a request reservation register 126 for subsequent arbitration after being processed by the prioritizer means 113 and the rest of the arbitration system of FIG. 3.

As an alternative, the resource reservation register 125 may itself be linked to the resource comparator means 123 in such a way that the incoming RR vector at the comparator is also compared to the reserved resources to ensure that available resources are in fact made available for executing a selected command only if they have not been previously reserved within the RRV 125.

In essence, the arbitration scheme of this invention is based upon determining the resources that are required for executing a selected command, determining whether all of the required resources are available after first ensuring that none of the available resources have been reserved previously arbitrated requests, reserving all required resources when it is determined that any of the required resources for a particular command are either not available or have been reserved by previous requests, and finally indicating as capable of being processed requests for which all required resources are both available and not reserved for previously executed requests.

Figure 6:
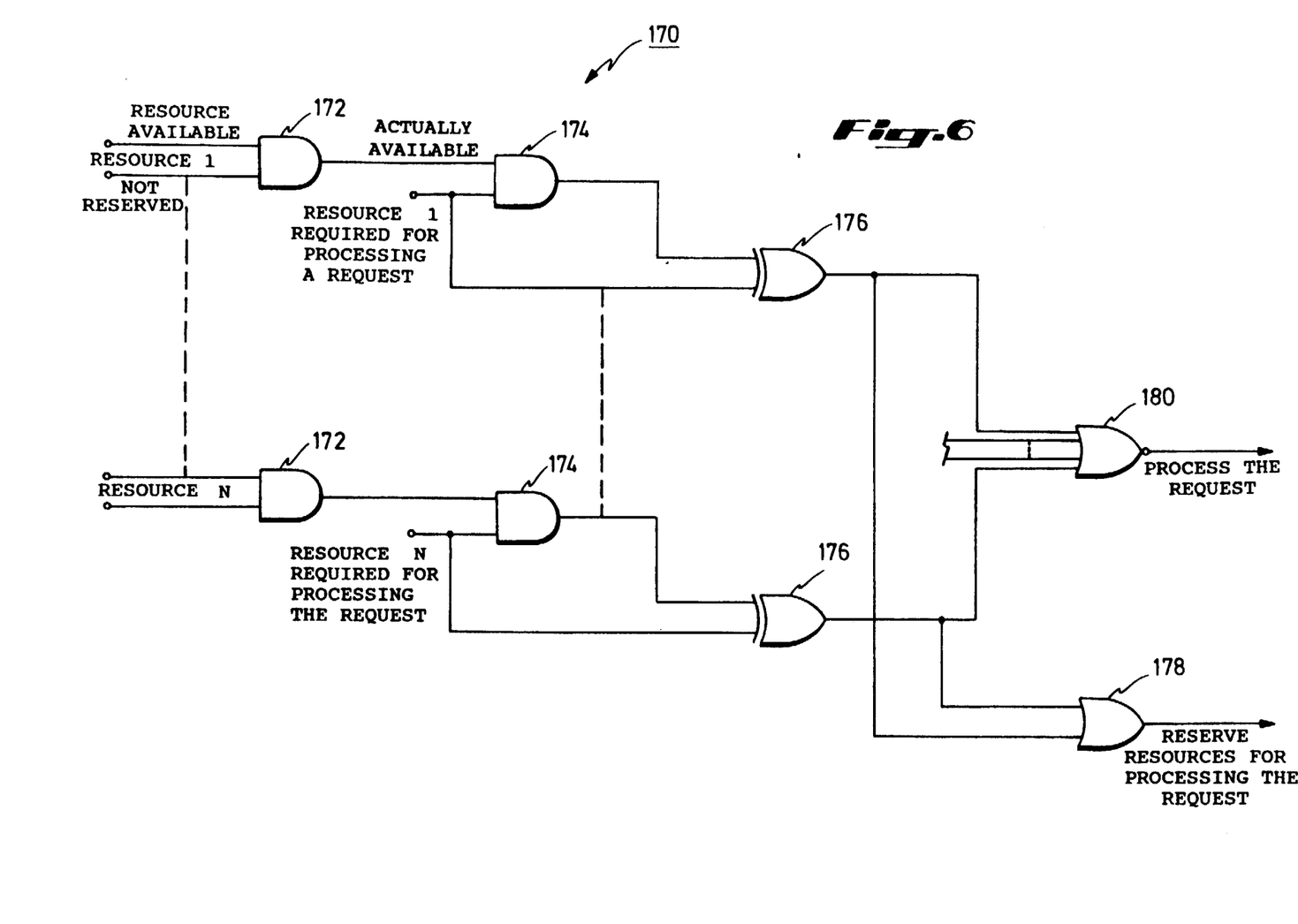
FIG. 6 is a schematic diagram illustrating a preferred logic arrangement for implementing the resource comparator of FIG. 3.

Referring now to FIG. 6, there is shown a preferred logic arrangement for implementing the above scheme for identifying when a particular request being arbitrated is capable of being honored. The arrangement 170 includes a plurality of AND gates 172 each adapted to accept at its two inputs signals respectively indicating the availability and unreserved status of a particular resource. As many AND gates 172 are provided as the number of discrete system resources that can be used for processing communication requests. According to a preferred embodiment, 32 such AND gates 172 are provided for accepting status signals related to the 32 designated system resources. The output of each AND gate 172 provides an indication of the actual availability of the corresponding resource. More specifically, the output goes high, i.e., becomes asserted, only when both of the inputs to the gate are high, i.e., only when the corresponding resource is both available for use by the system and is at the same time not reserved by a previous request.

From each AND gate 172 the signal indicating the availability of a resource is fed as one of the inputs to a second AND gate 174 which also accepts at its input a signal indicating that the resource is required for executing a selected command. It should be noted that the signal indicating the request status of the resource is derived from the required resource vector RR and represents the status of that bit from the RR vector which corresponds to the particular resource being compared. The output of AND gate 174 accordingly gets asserted only if both signals at its input are high, i.e., only if the particular resource is both available and required.

The output of AND gate 174 is fed as one of the two inputs to an exclusive OR gate 176; the gate is also provided with the required resource signal fed to gate 174 as its second input. The exclusive OR operation performed by gate 176 produces an output which is high only if the two input signals fed to it are distinct. Consequently, the output of gate 176 goes high only when the resource available signal is low and the resource required signal is high, i.e., only when the subject resource is required but not currently available. The outputs of all exclusive OR gates 176 corresponding to all the system resources are fed as inputs to an OR gate 178. The output of gate 178 is accordingly high anytime that one or more of its input are high, i.e., anytime that any of the required system resources corresponding to a request being processed are not available. The signal serves as an indication that all resources required for the particular request need to be reserved and is used to transfer the resources required vector generated by the command transformer into the reserve resources register RRV.

The output of each exclusive OR gate 176 is low anytime that the two signals at its input are equal; accordingly, if the subject resource is actually available to the system as indicated by the existence of a high output at AND gate 174, and if the resources are also required for executing the command as indicated by the resource required signal also being high, the resultant output of gate 176 is also high. A high output at gate 176 accordingly indicates that the subject request is both required and available for processing. In order to assess such a condition, the outputs of all exclusive OR gates 176 are also fed as inputs to a NOR gate 180 for generating a high output if all input signals fed to the signals are high. Accordingly, if the signals at the output of all exclusive OR gates 176 of the comparison arrangement are high, i.e., if all required resources are available and not reserved, the output of NOR gate 178 is correspondingly high and functions as a signal for initiating the processing of the subject request.

The specific manner in which the output signals of gates 178 and 180 are used to effect the reservation of all required resources and the processing of arbitration requests is not critical to the implementation of this arbitration scheme; many conventional methods for achieving this will be apparent to those skilled in the art and accordingly no such details need to be provided here. What is important is that the reserve signal be generated anytime one or more of the resources required for executing a particular command are either not available to the system or have been placed on reserved status and that the process request signal be generated only when all required resources are currently available for executing a command.

The following description will clarify the preferred manner in which the required resources for a selected command are designated within the command transformer means (119 in FIG. 3) in order to generate the corresponding RR vector. The selection of the set of commands designated for arbitration is based upon identifying, from the overall set of system-executable commands, a subset which represents a limited number of commands for which fast execution times are critical; the remaining system commands may be processed by the system microcode or according to other conventional means. The selected subset is then divided into a number of broad command categories for each of which a common group of required memory resources may easily be identified. A command being arbitrated is first decoded according to conventional techniques and if found to be a memory command is subsequently identified as belonging to one of the predefined command categories. Preferably, the command subset is designated as encompassing the following four memory command categories:

Memory Read;
Memory Write;
Input/Output Read; and
Input/Output Write.

For each of these categories, an exhaustive list of all commands which may be designated therein is prepared. Also, all system resources required for executing each of the four types of commands are designated. Accordingly, when a decoded command is identified as belonging to one of the memory command categories, the corresponding set of required resources is immediately known. In this manner the arbitration of memory commands is significantly expedited and is of particular advantage because of the critical need for urgent processing of memory commands from system units.

As a typical example, memory write operations require the use of the following resources in order to be executed: a memory command buffer corresponding to the particular memory unit that needs to be accessed; a destination path to the particular memory unit and the memory segment therein; a data path crossing if the requesting unit is a modular level removed from the desired data path and destination; and a data source path for the system unit originating the command. Accordingly, anytime a decoded command is found to fall under the memory write category, the above-listed resources are designated as required resources; more specifically, the resource table entry (see FIG. 5) corresponding to memory write commands is represented by asserting the bits corresponding to these resources. For instance, if the command addresses segment 1 in memory unit 1 and is originated by CPU 4 which has been defined as requiring a data path crossing to access memory unit 1, the corresponding 32-bit RR vector would have bit Nos. 7, 24, 13, and 29 asserted. Typical commands falling under the memory read category include read refill, write refill, write refill link, write refill lock, write refill unlock, DMA read, and DMA read lock. Anytime one of these commands in this category is being arbitrated, the corresponding RR vector includes the resources designated in common for the category.

On a similar basis, the remaining categories are defined to include a predefined set of common resources. The memory write category, for instance, includes the write back, the DMA write, and the DMA write unlock commands. The I/O read category includes the read I/O register command and the service processor read commands, while the I/O write category includes the write I/O register command, and the service processor write command. Commands which do not fall under any of the memory command categories or those requiring additional resources can have individually defined groups of required resources for generating corresponding RR vectors.

It will of course be understood that all system commands selected for operation under the arbitration scheme of this invention, including all memory commands, may have individually defined groups of required resources instead of using the "common category" approach. As another alternative, each bit representing a system resource may have designated therewith a corresponding set of system commands capable of asserting the bit; the corresponding RR vector could be generated by decoding a command, comparing it with each of the resource bits, and asserting or negating a bit on the basis of whether or not the command falls within the command set associated with the bit. Accordingly, it will be apparent that the present arbitration scheme is not restricted to a particular method of generating the RR vector; it is merely required that the system be capable of generating a list of all system resources required for executing a command associated with a request selected for arbitration.

As evident from the foregoing description, the arbitration scheme of this invention essentially involves the initiation of arbitration by means of a reserve pass followed by as many alternating recheck and non-reserve passes as needed in order to arbitrate and honor all outstanding reserved requests. When no more reserved requests are found to be pending, a new reserve pass is initiated and it is followed again by the alternating non-reserve and recheck passes. The arbitration sequence is accordingly non-stop and is a distinct improvement over conventional arbitration schemes involving sporadic polling of requests which typically results in impaired system performance due to inefficient utilization of system resources.

The present scheme makes efficient use of all system resources that are available at the time a selected request is being arbitrated. In addition, arbitration according to the present scheme is of a non-lock out nature; this is because of the fact that reservation of required resources is permitted only during the initial reserve pass and the subsequent recheck and non-reserve passes are devoted exclusively to arbitration and execution of outstanding reserved requests and subsequently received requests, respectively, for which required resources are in fact available. Accordingly, every request which has been put on reserved status is guaranteed to be honored within a reasonable time so that a requesting unit is never locked out.

We claim:

1. A method of operating a computer system; said computer system having a plurality of system units generating service requests, and a plurality of scarce system resources required for performing processes required for satisfying said service requests; each of a plurality of said service requests requiring the simultaneous availability of a plurality of said scarce system resources to perform processes required for satisfying said each of a plurality of said service requests; said method comprising the steps of:

(a) receiving one of said plurality of said service requests from one of said system units;

(b) generating a first vector defining all of said scarce system resources required for performing said processes required for satisfying said one of said plurality of said service requests;

(c) generating a second vector representative of all of said scarce system resources that are presently available;

(d) comparing said first and second vectors; and (1) when said comparing indicates that there are presently available all of said scarce system resources required for performing said processes equired for satisfying said one of said plurality of said service requests, using said scarce system resources for performing said processes required for satisfying said one of said plurality of said service requests; and (2) when said comparing indicates that there are not presently available all of said scarce system resources required for performing said processes required for satisfying said one of said plurality of said service requests, then (i) placing said one of said plurality of said service requests on 'reserved' status, (ii) reserving all of the scarce system resources required for performing said processes required for satisfying said one of said plurality of said service requests, and (iii) when there are presently available all of said scarce system resources required for performing said processes required for satisfying said one of said plurality of said service requests, operating said computer system to use all of said scarce system resources required for performing said processes required for satisfying said one of said plurality of said service requests.

wherein said method further comprising the step of storing in an electronic memory a command corresponding to said one of said plurality of said service requests, and wherein said step (b) is performed when said command has priority, according to a predetermined priority scheme, over other commands that are stored in said electronic memory and that correspond to other of said plurality of said service requests, wherein said predefined priority scheme includes, for the stored commands:

a first arbitration pass (the "reserve pass") during which storage locations in said electronic memory are polled and commands stored in said storage locations at that time are arbitrated by executing commands corresponding to service requests for which all required scarce system resources are available and placing on reserved status all commands corresponding to service requests for which all required scarce system resources are not available;

a second arbitration pass (the "recheck" pass) during which only reserved commands are executed by executing those reserved commands for which all required scarce system resources have become available and reserving all required scarce system resources for those reserved commands for which all required scarce system resources are not available; and a third arbitration pass (the "non-reserve" pass) during which only those commands stored in said storage locations subsequent to a previous "reserve" pass (the "new" requests) are arbitrated by executing those new commands for which all required scarce system resources are available.

2. The method of operating a computer system as claimed in claim 1, wherein after execution of an initial "reserve" pass, successive "recheck" and "non-reserve" passes are executed alternately until all commands reserved during the initial "reserve" pass have been executed.

3. In a multi-processor system having a system control unit (SCU) for operating a plurality of processors in a parallel fashion, wherein each of said processors is ported into the SCU, the SCU being operative to controllably allow said processors to access addressed segments of a system memory, a method of controlling communication through said SCU in response to communication requests received at the SCU ports from said processors in an efficient and fair manner, each of said requests having a corresponding command that needs to be executed in order to honor said each of said requests by reserving a data transmission path through said SCU, said method comprising the steps of:

(a) storing in an electronic memory the incoming requests;

(b) selecting, on the basis of a predefined prioritizing scheme, requests to be arbitrated;

(c) extracting the command corresponding to each request selected to be arbitrated;

(d) generating a first vector defining all system resources required for executing the extracted command;

(e) generating a second vector representative of all system resources that are presently available for executing said extracted command;

(f) comparing said first and second vectors; and (1) when said comparing indicates that all of said system resources required for executing said extracted command are presently available, honoring said selected request by executing said extracted command to reserve a data transmission path through said SCU and initiate data transmission over said path; and (2) when said comparing does not indicate that all of said system resources required for executing said extracted command are presently available, then (i) placing the request corresponding to said extracted command on 'reserved' status, (ii) reserving said system resources required for executing said extracted command, and (iii) when all of said system resources required for executing said extracted command corresponding to the reserved request become available, honoring said reserved request by executing said extracted command to reserve a data transmission path through said SCU end initiate data transmission over said path, wherein said method further includes:

a first arbitration pass (the "reserve pass") during which all SCU ports are polled and requests outstanding at the time are arbitrated by honoring requests for which all required system resources are available and placing on reserved status all requests for which all required system resources are not available, a second arbitration pass (the "recheck" pass) during which only reserved requests are arbitrated by honoring those reserved requests for which all required system resources have become available at the time and reserving all required system resources for those reserved requests for which all required system resources are not available at the time, and a third arbitration pass (the "non-reserve" pass) during which only those requests received at the SCU following the previous "reserve" pass (the "new" requests) are arbitrated by honoring those new requests for which all required system resources are available.

4. The method of controlling communication of claim 3, wherein, after execution of an initial "reserve" pass, successive "recheck" and "non-reserve" passes are executed alternately until all requests reserved during the initial "reserve" pass have been honored.

5. A computer system comprising, in combination:
(a) a plurality of system units;
(b) a plurality of system resources for satisfying service requests from said system units, each of a plurality of said service requests requiring the simultaneous availability of more than one of said system resources to perform processes required for satisfying said each of a plurality of said service requests;
(a) storing means coupled to said system units for storing the service requests from said system units for performing said processes;
(b) selecting means coupled to said storing means for selecting one of the stored service requests for arbitration;
(c) resource checking means coupled to said selecting means for determining whether or not all system resources required for performing all processes required for satisfying the selected one of said service requests are presently available;
(d) process initiating means coupled to said resource checking means for initiating all processes required for satisfying the selected one of said service requests when said resource checking means determines that all system resources required for performing all processes required for satisfying said selected one of said service requests are presently available;
(e) resource reserving means coupled to said resource checking means for reserving system resources required for performing processes required for satisfying said selected one of said service requests when said resource checking means determines that all system resources required for performing all processes required for satisfying said selected one of said service requests are not presently available, said reserved resources being made unavailable to subsequent requests and not being used for satisfying said selected one of said service requests until all system resources required for performing all processes required for satisfying said selected one of said service requests become available.

wherein said selecting means includes:
request reserving means coupled to said resource checking means for placing on reserved status service requests that were not satisfied due to unavailability of required system resources as determined by said resource checking means;
re-check pass means coupled to said storage means for selecting only service requests stored in said storage means that were placed on reserve status by said request reserving means; and
non-reserve pass means operative after said re-check pass means for selecting only service requests stored in said storage means that have not been placed on reserve status by said request reserving means.

6. The computer system as claimed in claim 5, further comprising control means coupled to said request reserving means, said re-check pass means and said non-reserve pass means, for alternately operating said re-check pass means and said non-reserve pass means from a time when said request reserving means places on reserve status more than one of said service requests to a time when said process initiating means has initiated all processes required for satisfying all of said more than one of said service requests.

* * * * *